(12) United States Patent
Hochman et al.

(10) Patent No.: US 11,837,193 B2
(45) Date of Patent: Dec. 5, 2023

(54) OFF-AXIS COLOR CORRECTION IN DYNAMIC IMAGE CAPTURE OF VIDEO WALL DISPLAYS

(71) Applicant: H2VR HoldCo, Inc., Covina, CA (US)

(72) Inventors: Jeremy Hochman, Walnut, CA (US); Christopher S. Byrne, Pasadena, CA (US)

(73) Assignee: H2VR HOLDCO, INC., Covina, CA (US)

( * ) Notice: Subject to any disclaimer, the term of this patent is extended or adjusted under 35 U.S.C. 154(b) by 0 days.

(21) Appl. No.: 18/137,198

(22) Filed: Apr. 20, 2023

(65) Prior Publication Data

US 2023/0260480 A1 Aug. 17, 2023

Related U.S. Application Data

(63) Continuation of application No. PCT/US2021/056123, filed on Oct. 21, 2021.
(Continued)

(51) Int. Cl.
*G09G 5/02* (2006.01)
*G09G 5/06* (2006.01)
(Continued)

(52) U.S. Cl.
CPC .............. *G09G 5/02* (2013.01); *G06V 10/56* (2022.01); *G09G 3/32* (2013.01); *G09G 2300/026* (2013.01); *G09G 2320/0666* (2013.01)

(58) Field of Classification Search
CPC .. G09G 5/02; G09G 5/04; G09G 5/06; G09G 5/10; G09G 5/227; G09G 5/30; G09G 5/39; G09G 5/42; G09G 3/32; G09G 3/3233; G09G 3/3258; G09G 3/34; G09G 3/36; G09G 2300/023; G09G 2300/026; (Continued)

(56) References Cited

U.S. PATENT DOCUMENTS

2001/0048413 A1* 12/2001 Tabata ................ H04M 1/0214
345/87
2016/0202758 A1* 7/2016 Peana ..................... G06F 3/013
345/601

(Continued)

OTHER PUBLICATIONS

International Search Report and Written Opinion dated Jan. 19, 2022, in connection with PCT/US2021/056123 filed on Oct. 21, 2021.

*Primary Examiner* — Wesner Sajous
(74) *Attorney, Agent, or Firm* — Downs Rachlin Martin PLLC (57) ABSTRACT

Disclosed systems and methods for off-axis color correction in dynamic image capture of video wall displays involve measuring color performance of specific LED tiles or video walls and providing a database to store the characteristics of these off-axis measurements for use in color correction. The database is accessible by a color correction engine associated directly or indirectly with the video rendering engine so that when combined with real-time information on camera view angle and field of view relative to the display, a color correction function can be incorporated into the rendering of the display portion within the field of view of the camera so as to reduce or eliminate off-axis color variations/distortions in the captured image.

17 Claims, 10 Drawing Sheets

Related U.S. Application Data (60) Provisional application No. 63/094,747, filed on Oct. 21, 2020.

(51) Int. Cl.
  *G09G 5/10* (2006.01)
  *G09G 3/32* (2016.01)
  *G09G 3/36* (2006.01)
  *H04N 1/60* (2006.01)
  *H04N 5/57* (2006.01)
  *G06V 10/56* (2022.01)

(58) Field of Classification Search
  CPC ........... G09G 2320/00; G09G 2320/02; G09G 2320/0209; G09G 2320/0233; G09G 2320/0242; G09G 2320/0271; G09G 2320/028; G09G 2320/0666; G09G 2320/0276; G09G 2320/0285; G09G 2320/04; G09G 2320/06; G09G 2320/0673; G09G 2320/068; G09G 2320/0693; G09G 2340/00; G09G 2340/0435; G09G 2360/18; H04N 1/60; H04N 5/202; H04N 5/445; H04N 5/57–58; H04N 9/64; H04N 9/69; H04N 9/73; H04N 9/67; H04N 13/125; H04N 13/128; H04N 13/144; H04N 13/257; H04N 13/327; H04N 13/383; H04N 13/366; H04N 19/142; H04N 19/147
  USPC ......................................................... 245/589
  See application file for complete search history.

(56) References Cited

U.S. PATENT DOCUMENTS

| | | | |
|---|---|---|---|
| 2018/0020201 A1* | 1/2018 | Motta | H04N 7/142 |
| 2022/0357645 A1* | 11/2022 | Sisto | H04N 23/51 |
| 2023/0152672 A1* | 5/2023 | Bidwell | G03B 17/14 |
| | | | 396/419 |

* cited by examiner

OFF-AXIS COLOR CORRECTION IN DYNAMIC IMAGE CAPTURE OF VIDEO WALL DISPLAYS

RELATED APPLICATION DATA

This application is a U.S. Bypass Continuation Patent Application of PCT Application No. PCT/US2021/056123, filed Oct. 21, 2021, and entitled "Off-Axis Color Correction in Dynamic Image Capture of Video Wall Displays", which application claims the benefit of priority of U.S. Provisional Patent Application Ser. No. 63/094,747, filed Oct. 21, 2020, and titled "Off-Axis Color Correction for Dynamic Image Capture of Video Wall Displays". Each application is incorporated by reference herein in its entirety.

FIELD OF THE DISCLOSURE

The present disclosure generally relates to the fields of LED video displays and moving image capture. In particular, the present disclosure is directed to an off-axis color correction in dynamic image capture of video wall displays.

BACKGROUND

Video walls comprised of an array of LED display tiles and displaying dynamic images are with increasing frequency used as backgrounds for movie sets and broadcast video scenes. As one example, on movie sets, instead of the actors performing in front of a green screen with the background later added by CGI techniques, the actors perform in front of a video wall dynamically displaying the desired background scene, which is then captured along with the actors by the camera. In another example, for broadcast video, in a news broadcast the presenter is positioned in front of a video wall and the video camera captures both the presenter and images displayed on the video wall behind the presenter. Using this technique, the camera capturing the scene is capturing not only the live action or performance in front of the video wall, but also images concurrently displayed on the video wall behind the live action. The display on the video wall is thus an active and changing part of the scene being captured by the camera. Because the video camera is actually capturing a scene displayed on a video display wall, there are a number of challenges to be overcome so that the image captured by the video camera does not appear with artifacts or other distortions that would adversely impact the quality of the captured image.

One problem to be overcome is color distortions or variations that occur when the camera captures an image produced by an array of LED pixels at varying viewing angles. LED tiles have different color performance when viewed off-axis from perpendicular. This is due to the diode arrangement, in addition to physicalities of the pixel construction. Some pixels have RGB sub-pixel color components arranged in a vertical line, while others can be arranged in a triangle. The internal arrangement of the sub-pixel color components varies from manufacturer to manufacturer due to electronic or manufacturing constraints, particularly as parts are increasingly miniaturized. In addition to the non-uniformity of a single pixel, when a plurality of LEDs are placed on a circuit board to make up a display panel, it is possible for the physical structure of neighboring pixels to occlude each other and block certain portions of the pixel from being fully visible. All of these variations lead to a different appearance at different view angles. Depending on the view angle, the variations may be minor to dramatic.

Figure 6A:
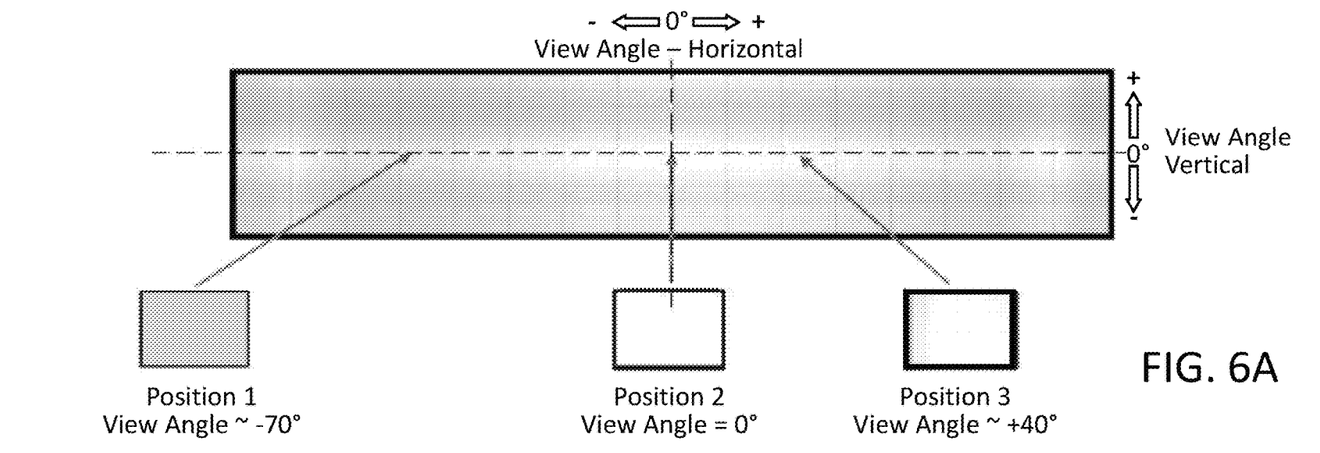
Figure 6B:
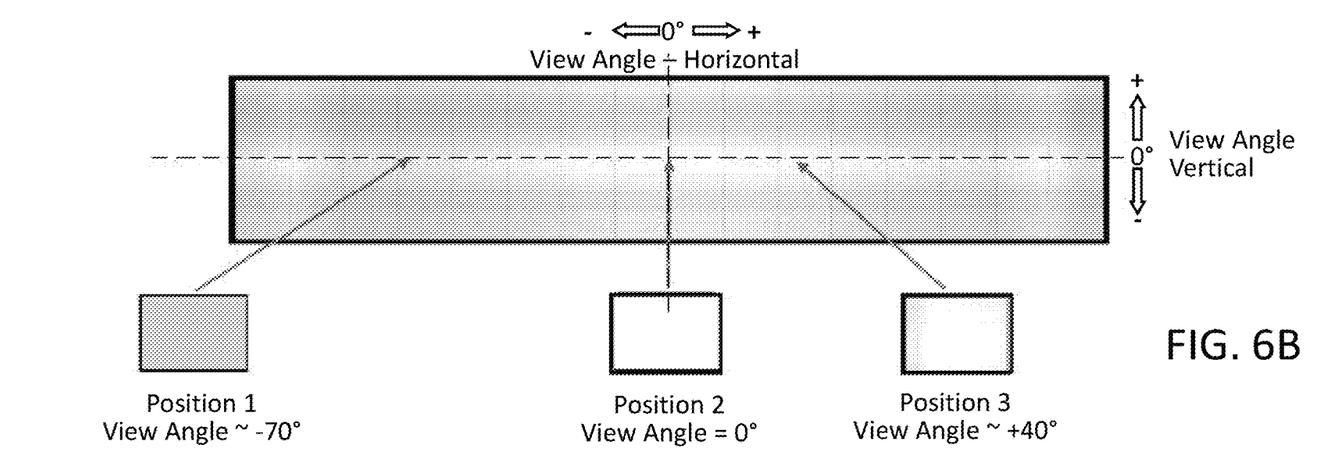
Figure 7A:
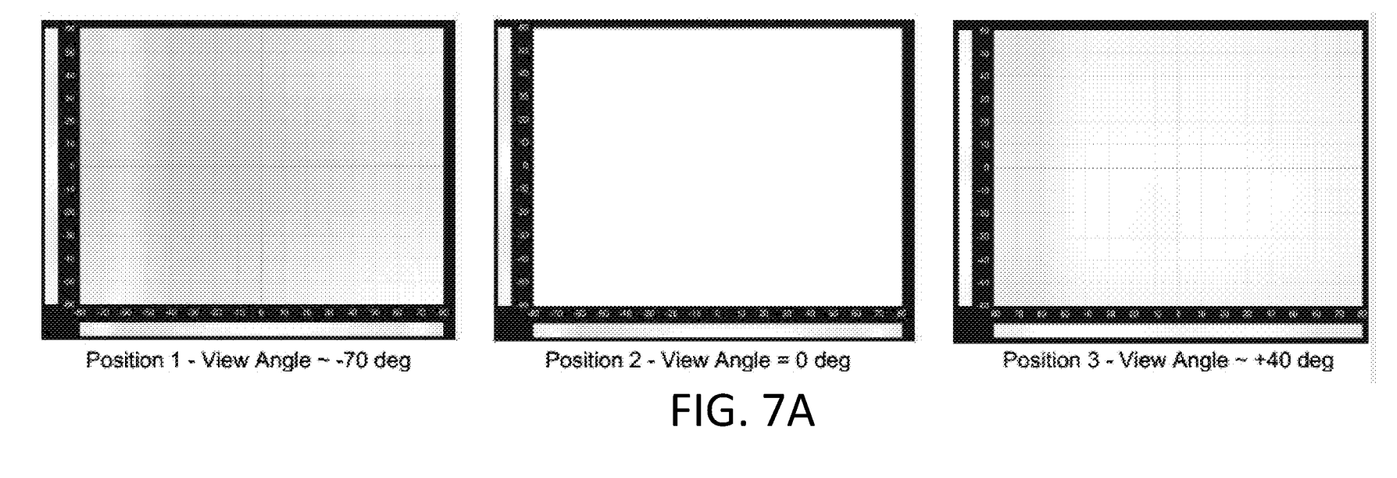
Figure 7B:
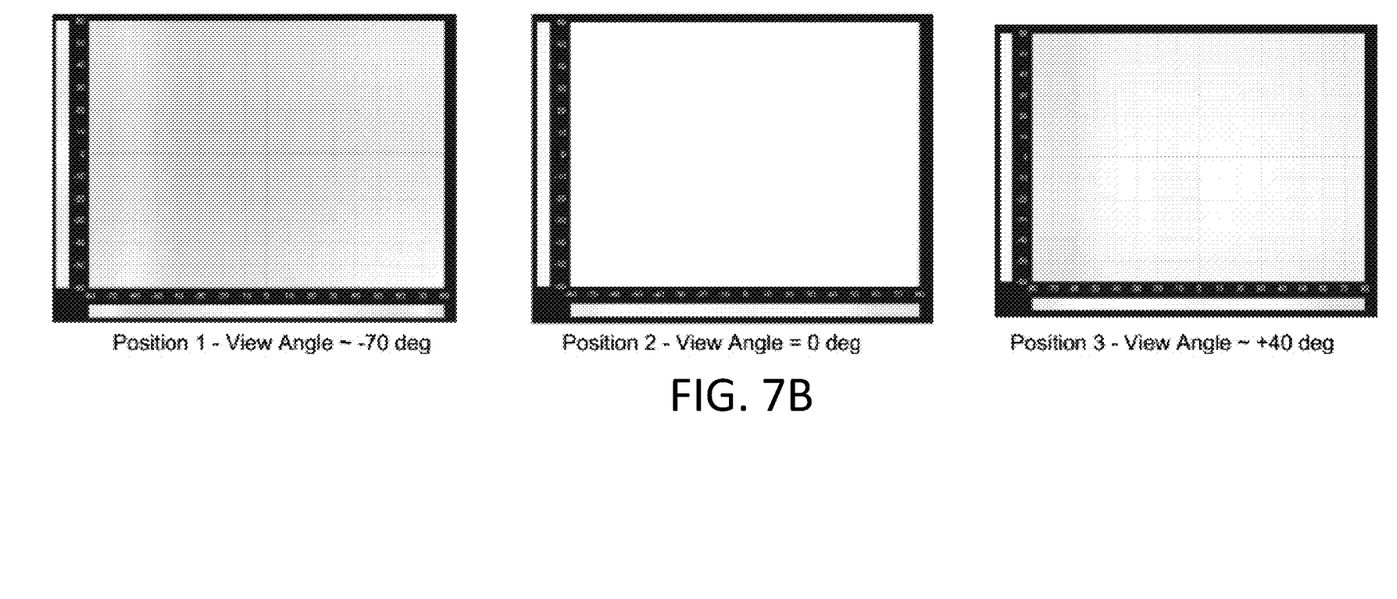

FIGS. 6A-B and 7A-B illustrate a simple example of these variations. (Note that FIGS. 6A and 6B, as well as FIGS. 7A and 7B, represent the same data and information with the only difference between the A and B figures being that A is shown in black and white and B is shown in full color. These two otherwise identical sets are presented only to guard against possible loss of quality or content as a result of electronic filing or storage by patent office systems).

As seen in FIGS. 6A-B and 7A-B, the lack of uniformity of a display viewed from different angles can be quite unattractive for critical content, such as flat white fields, or corporate logos that must remain the "same" color or shade no matter the viewing angle. The amount of variation from the standard or desired color—in this case a blank screen presenting the standard illuminant D65—can vary based on the amount of variation from the perpendicular view angle (Position 2). Note that FIGS. 6A and B present a simplified depiction in that the only variation shown between Positions 1, 2 and 3 is along the horizontal axis. The same type of color variation occurs in the same manner when the view angle deviates in the vertical direction above or below the display centerline. The details shown for Positions 1, 2 and 3 also represent the view over a fixed field of view at each position.

Figure 9:
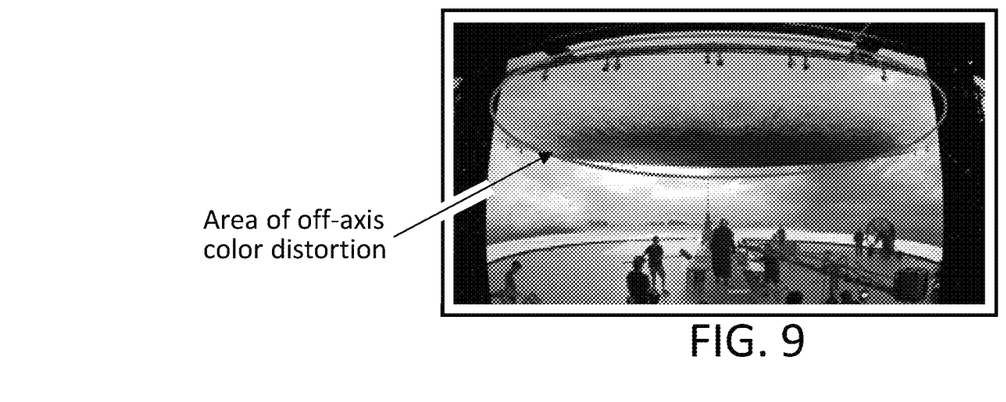
FIG. 9 is a still image of a movie set employing a three-dimensional LED volume for virtual display of background scenes, illustrating the color distortions that can result from off-axis image capture, in particular along the joined edges of angled display surfaces such as a ceiling and wall.

FIGS. 7A and 7B are enlargements of the smaller view angle details for Positions 1, 2 and 3 shown in FIGS. 6A and 6B. When viewed at Position 1, corresponding to a horizontal view angle of minus seventy degrees and a vertical view angle of zero degrees, the area of the screen within the field of view is noticeably pink at the left side, transitioning to blue in the center and back to a light pink. When viewed at Position 3, corresponding to a horizontal view angle of plus forty degrees and a vertical view angle of zero degrees, the area of the screen within the field of view is again noticeably pink shaded at the left side but transitions to a close to white shade in the center and then pinkish again towards the left side. The appearance at Position 3 shows less variation than the appearance at Position 1 because the view angle is less deviated from zero degrees. Position 2 shows the D65 illuminant as it appears when viewed directly on at a zero degree view angle. The images presented in FIGS. 6A-B and 7A-B are based on a simple display of uniform D65 illuminant. In practice, when the display wall presents an image with complex color variations and movement, the distortions in color can be very dramatic at certain view angles dependent on the physical configuration of the LED tiles and video wall. This is particularly true at the intersections of facetted displays such as three-dimensional LED volumes as illustrated in FIG. 9.

Figure 8:
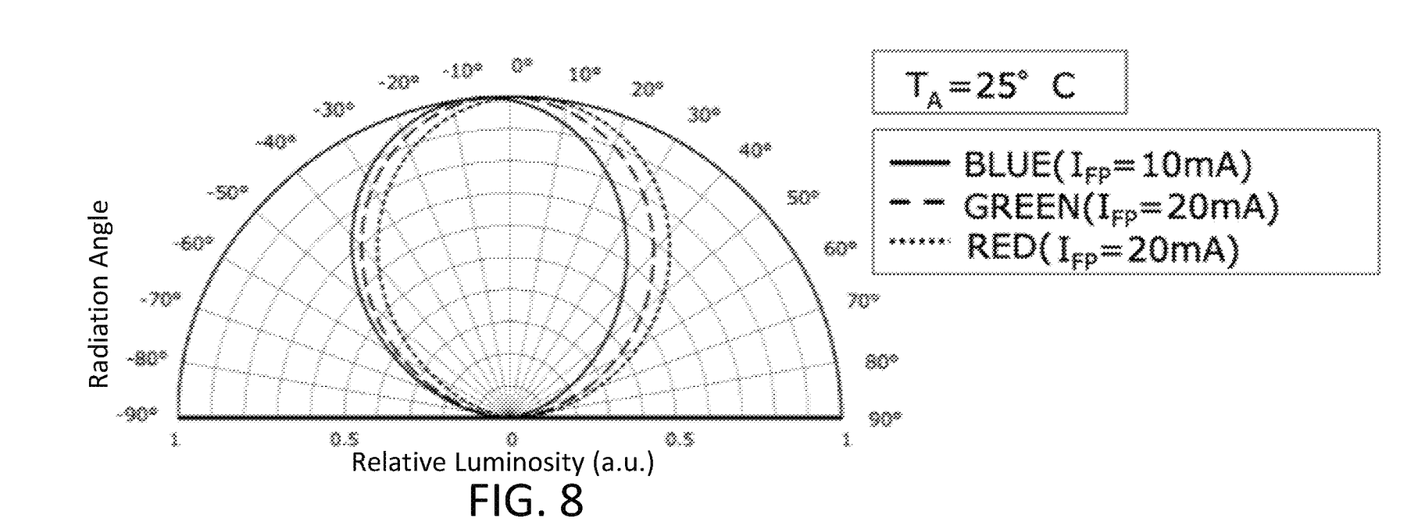
FIG. 8 is an example of an LED color pixel manufacturer color characterization diagram.

LED pixel manufacturers typically provide characterization data to describe color variation over angle for individual pixels. Diagrams/graphs of these measurements can be in the form of white point uniformity or red/green/blue uniformity. FIG. 8 presents an example of one such characterization diagram. Such measurements are usually provided by component manufacturers to give integrators the specifications of these components. However, it is not common for a display or LED tile manufacturer to provide such data for a fully-assembled display panel. Further, there is no industry standard for taking such measurements at an integrated product level. This may be due to the fact that the display manufacturers and the component makers are typically not the same entities, and therefore the display manufacturer has no control (and thus no incentive) over improving these characteristics. There is thus a need for an understanding of how color varies over viewing angle in specific video wall configurations and a means for compensating for that variation in order to provide improved image quality in image capture scenarios as described above.

There thus remains a need in the art for a technical solution providing improved image capture without requiring extensive post-processing color and artifact correction.

SUMMARY OF THE DISCLOSURE

In one embodiment, a system for off-axis color correction in dynamic image capture of video displays, may comprise a database and a correction engine and may alternatively further comprises a camera field of view resolver. The database contains at least off-axis color uniformity characteristics for a video display at a plurality of viewing angles. The correction engine is configured to receive off-axis color uniformity characteristics from the database and to apply a color uniformity correction layer to a video stream to be presented on the video display. The color uniformity correction layer is based on the received off-axis color uniformity characteristics for a current image capture angle and field of view, whereby color distortions in the captured images due to off-axis image capture are reduced or eliminated. The current image capture angle and field of view may be determined by the FOV resolver, which his configured to determine the current angle and field of view of the image capture device with respect to a video display based on inputs from a camera tracking system.

In another embodiment a system for off-axis color correction in dynamic image capture of video displays comprises a database containing off-axis color uniformity characteristics for a video display at a plurality of viewing angles, an FOV resolver configured to determine the current angle and field of view of the image capture device with respect to a video display based on inputs from a camera tracking system, a correction engine, and an application programing interface controlling communication between at least the database and correction engine. The correction engine is configured to receive off-axis color uniformity characteristics from the database, and to apply a color uniformity correction layer to a video stream to be presented on the video display. The color uniformity correction layer may be based on the received off-axis color uniformity characteristics for the current image capture angle and field of view. The correction engine may be further configured to generate the color uniformity correction layer based on a color correction function and the received off-axis color uniformity characteristics. In this manner distortions in the captured images due to off-axis image capture are reduced or eliminated.

In yet another alternative embodiment, a method for off-axis color correction in dynamic image capture of video displays comprises steps of retrieving off-axis color uniformity characteristics for a video display at a plurality of viewing angles, determining a current viewing angle and field of view for an image capture device relative to the video display, accessing the off-axis color uniformity characteristics corresponding to the determined viewing angle and field of view, and generating a color uniformity correction layer for a video stream to be presented on the display within the determined field of view based at least on the retrieved off-axis color uniformity characteristics and the determined viewing angle and field of view. The color uniformity correction layer thus generated optionally may be communicated to a process controller associated with displaying the video on the video display. Disclosed methods also may further comprise producing a color corrected video stream corresponding to the current viewing angle and field of view by applying the color correction layer to the video stream at the process controller.

In various alternatives, the process controller applying the color uniformity correction layer may comprise any one or more of at least one rendering engine of a video display system, individual tile controllers for a plurality of tiles forming a video display, one or more video processors, or a cloud or network-based processing system. Locating the processing of the color correction engine in a cloud-based processing system may be desirable when cloud-based/stored video content is used as the video source.

BRIEF DESCRIPTION OF THE DRAWINGS

For the purpose of illustrating the disclosure, the drawings show aspects of one or more embodiments of the disclosure. However, it should be understood that the present disclosure is not limited to the precise arrangements and instrumentalities shown in the drawings, wherein:

FIG. 1A is an illustrative example of a plot of relative color gain level vs. horizontal angle for an LED video wall as measured by a spectroradiometer. FIG. 1A presents the same data as presented in the corresponding plots included in FIGS. 1 and 2.

FIGS. 6A and 6B depict a simple example of color distortions that can arise from off-axis viewing of an LED video wall, wherein FIG. 6A presents the example in black and white and FIG. 6B presents the same example in color.

FIGS. 7A and 7B depict detail views of the screen portions as viewed at Positions 1, 2 and 3 of FIGS. 6A and 6B, wherein FIG. 7A presents the examples in black and white and FIG. 7B presents the same examples in color.

DETAILED DESCRIPTION

Examples of systems and methods for off-axis color correction in dynamic image capture of video wall displays addressing short comings of the prior art are illustrated in FIGS. 1-5, and further described hereinbelow. At a general level, such methods involve measuring color performance of specific LED tiles or video walls and providing a database to store the characteristics of these off-axis measurements for use in color correction. The database is accessible by the video wall image rendering device so that when combined with real-time information on camera view angle and field of view relative to the display, a color correction function can be incorporated into the rendering of the display portion within the field of view of the camera so as to reduce or eliminate off-axis color variations/distortions in the captured image. In this manner, the metadata for display tile performance can be read back so that real-time changes can be made computationally to content so that from a current camera angle the display looks uniform. The color correction function may be directly incorporated into the software of a specific render engine, or may be provided via an API to facilitate communication with and implementation by a variety of different manufacturers' video wall controllers or render engines. In a further alternative, the color correction may be instead incorporated into the video capture rather than in the displayed image.

Figure 1:
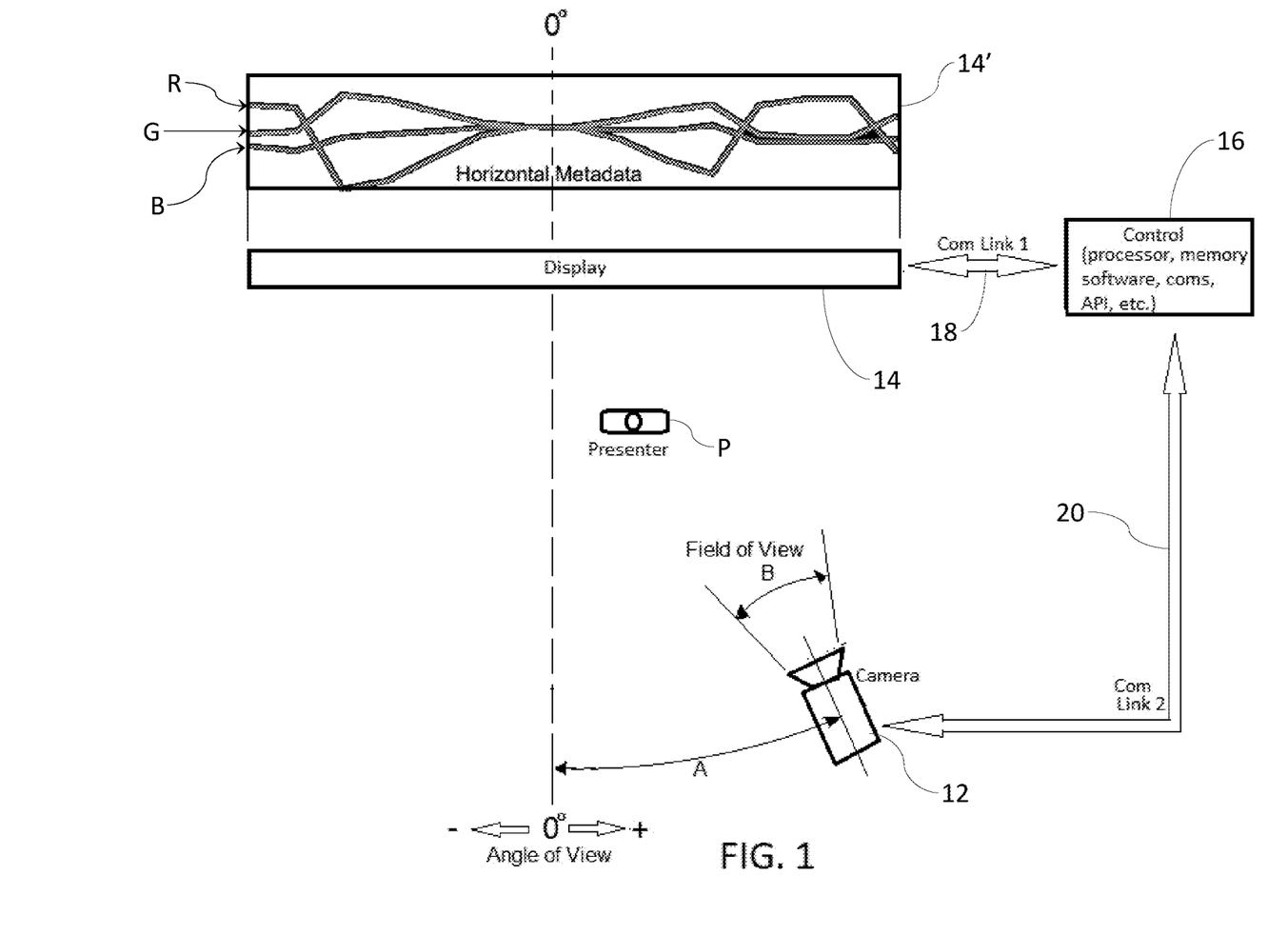
FIG. 1 is a schematic illustration of a system for off-axis color correction in dynamic image capture of video wall displays according to the present disclosure.

As shown in the example of FIG. 1, camera 12 is capturing a scene including a background display 14 with a presenter (P) in front of the display. Display 14 may be any commercially available or custom LED video wall display. The position and field of view of camera 12 relative to display 14 can change in both the horizontal and vertical directions. For the sake of conciseness, the only variation in the horizontal direction is shown in FIG. 1 and discussed in detail herein. Corrections based on changes in vertical view angle may be made in exactly the same manner as horizontal view angle corrections, and vertical and horizontal corrections may be combined by persons of ordinary skill based on the teachings provided herein. Another parameter taken into account is the field of view of camera 12, which may change based on zoom or physical position of the camera relative to the display. As shown in FIG. 1, angle A represents the changing view angle of camera 12 relative to the centerline of display 14 and angle B represents the changing field of view of camera 12.

Image control and rendering system 16 communicates with display 14 via wired or wireless communications link 18 (Com Link 1). Ethernet communication is a common communication mode for Com Link 1, however, any communication protocol suited to the video quality demands of the display may be used. Control system 16 also communicates via a wired or wireless communications link 20 (Com Link 2) with camera 12 itself, or other positioning system peripheral to the camera (not shown), to receive real-time information on the changing view angle A and changing field of view angle B. It is to be noted that the systems and methods described herein utilize as an input the camera field of view area on the surface of the display in order to determine which pixels require a color correction. Determination of field of view area requires inputs of at least physical camera position, orientation and field of view angle setting in the camera. Unless otherwise specified herein, "field of view" refers to the field of view area at the surface of the display as the term is frequently used in the LED/video display art.

Figure 1A:
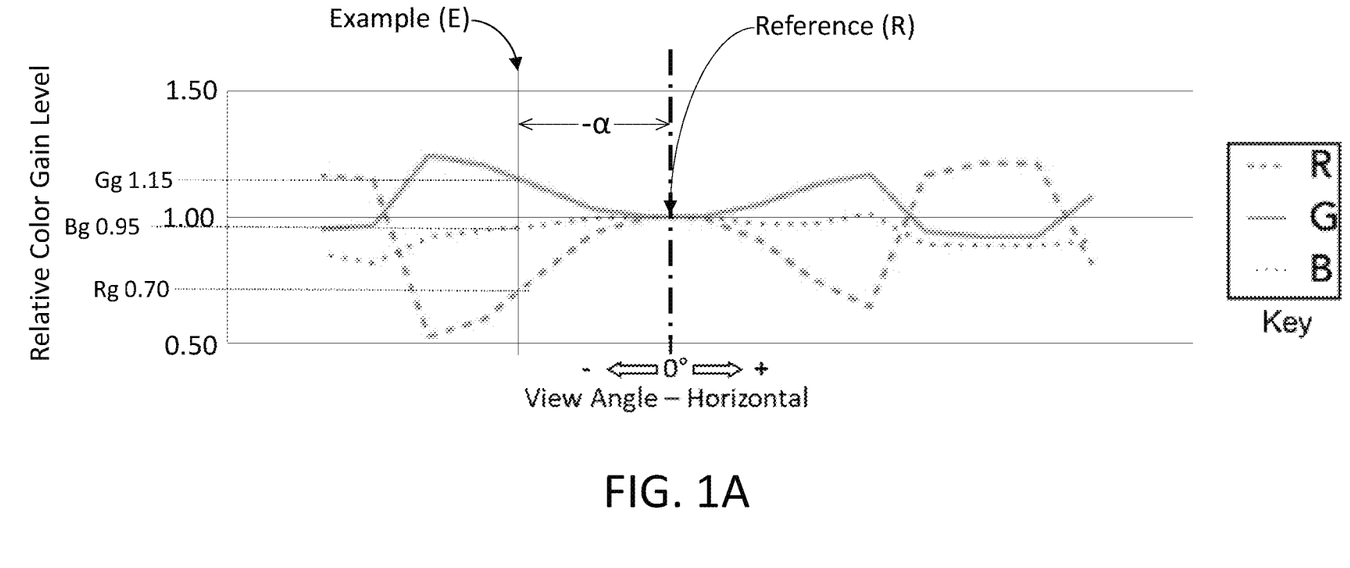

Horizontal color uniformity characteristics 14', shown in FIGS. 1 and 1A, are a form of color metadata and represents the relative amount of light emitted for each primary color at varying angles of view across the face of the display. Where displays are typically calibrated such that front-on (0 degrees) the display appears uniform at a desired white point (e.g., standard illuminant D65). Note that only the horizontal characteristics for the zero degree elevation is shown here. Color uniformity characteristics 14' representing color variation over view angle, is plotted in the figures of the present disclosure as relative color gain level vs. horizontal view angle (see. e.g., FIG. 1A). Other representations of the same color variation information may be employed by persons of ordinary skill, such as, but not limited to, color temperature value vs. view angle, Lxy chromaticity vs. view angle, or XYZ chromaticity vs view angle.

Figure 2:
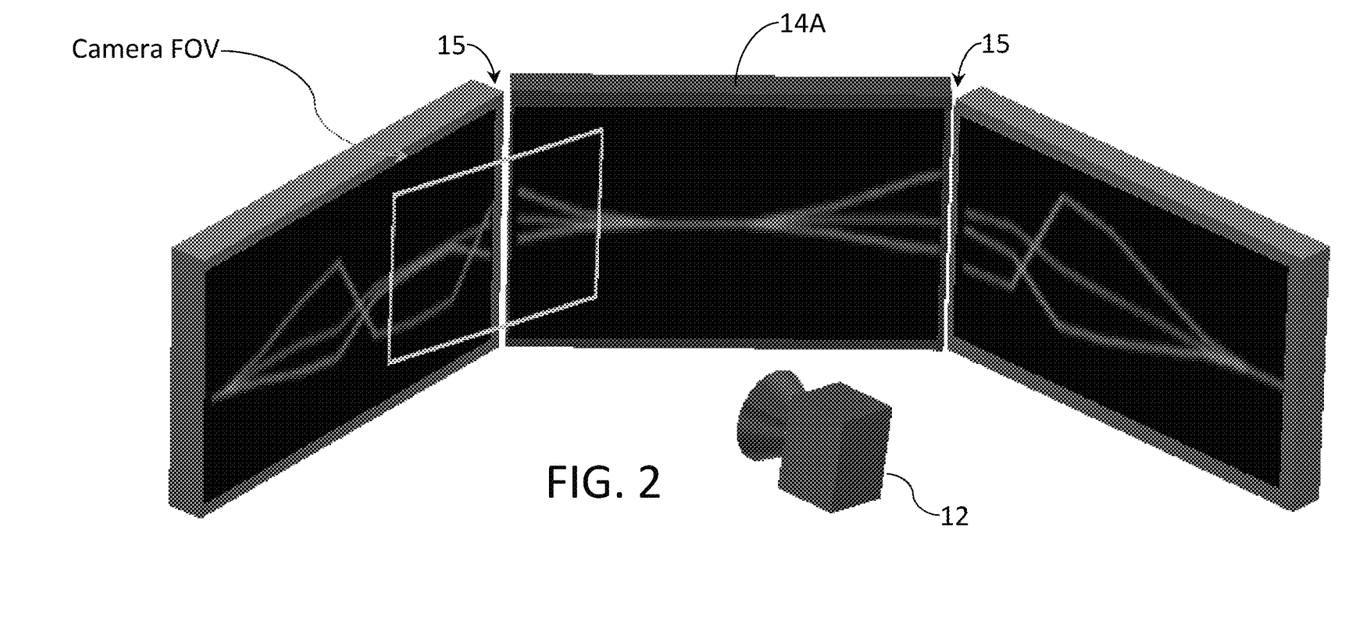
FIG. 2 is a schematic perspective depiction of a faceted video display wherein all display tiles are not in the same plane.

Embodiments disclosed herein are especially useful in effecting color correction when a camera is capturing a scene in a three-dimensional LED volume, such as is now often used as virtual backgrounds in movie and video production. A three-dimensional LED volume is a form of faceted display, having some surfaces of the display at angles to other surfaces (instead of being an entirely planar or gently curving display.) FIG. 2 schematically depicts a simplified faceted display 14A with camera 12 capturing a field of view (FOV) across the angle formed at the meet 15 between the facets. Because the walls of a faceted display are angled together, the effective angle of one of the walls results in the metadata as measured by the spectroradiometer being discontinuous across the facet meets 15. The fact that the metadata is now discontinuous means that there is not a gentle gradient of non-uniformity, but instead a hard edge between the facet meets 15. With a flat white video field as media content for the display, this can have an appearance in FOV as if one of the LED walls is bluish white and the other wall is reddish white with a hard edge in the middle. Correcting for this requires precise pixel-by-pixel metadata and camera tracking and positional data accurate to the sub-pixel level, thus making the color correction by prior art techniques such as combinations of manual adjustment color adjustment and video post-processing significantly more challenging than for planar displays.

Figure 3A:
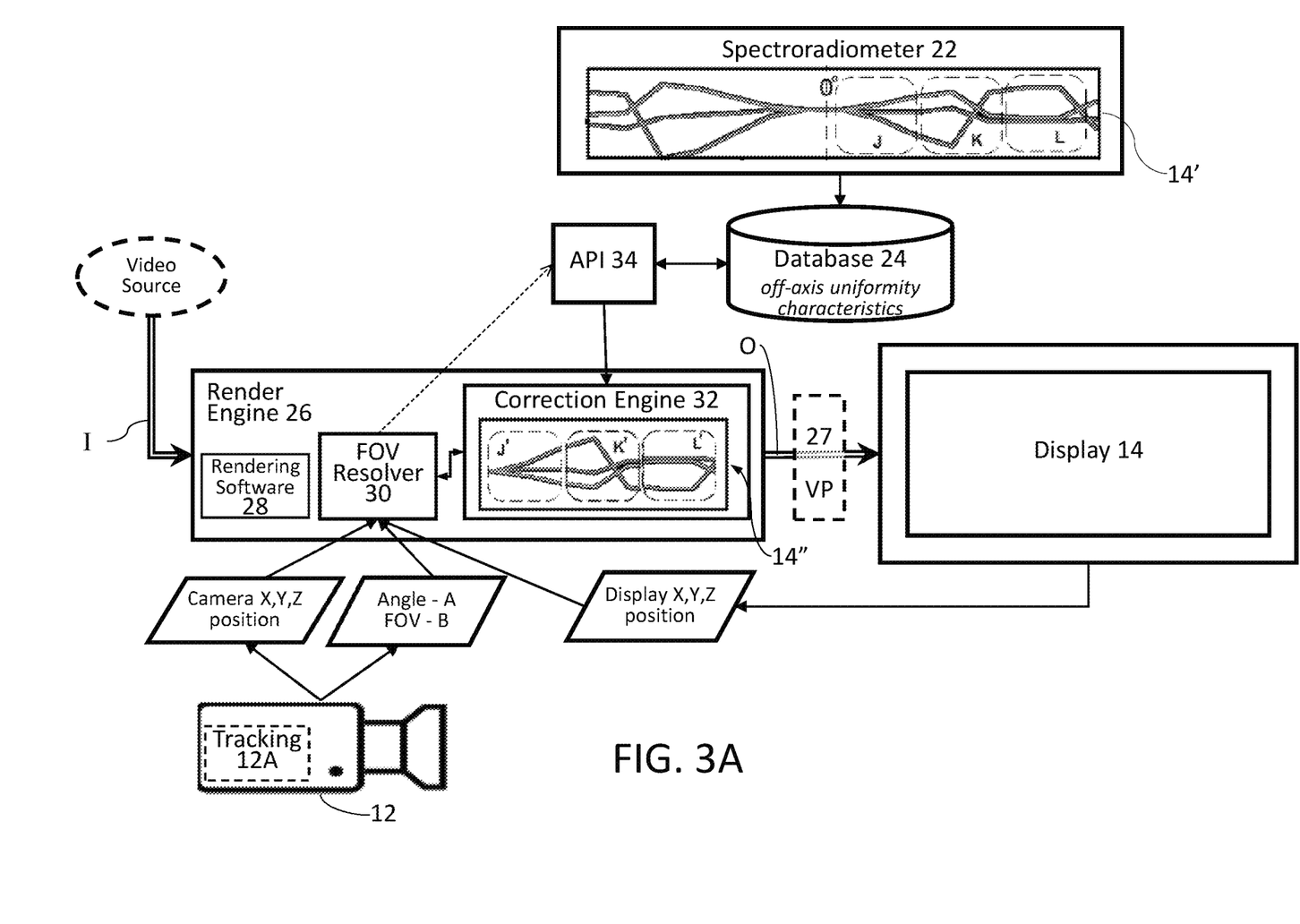
FIG. 3A is a block diagram illustrating an embodiment of a system for off-axis color correction in dynamic image capture of video wall displays according to the present disclosure with color correction executed in the render engine.

As shown in FIG. 3A, spectroradiometer 22 can be used to generate measurements 14' characterizing the color variation of display 14 across a full range of possible viewing angles. This characterization 14' is stored as display metadata in database 24 as off-axis uniformity characteristics. In one alternative, such measurements may be made for single LED tiles and then full display characterization for an entire display comprised of those tiles can be extrapolated based on the number of tiles in the display. In another alternative, an entire display may be measured. In one embodiment, database 24 stores metadata on off-axis uniformity characteristics for a variety of different LED tiles and the user may select current tile and display size to access the correct metadata for the current display configuration. In some embodiments, metadata 14' is captured continuously across the display, and then extrapolated to appropriate fields of view by measuring horizontal viewing angle (H) and vertical viewing angle (V) in specific angular increments (for example, at 10 degree increments) and then extrapolating data as needed between the increments.

In various embodiments, render engine 26 may receive off-axis uniformity characteristics from database 24 and uses that information to render the color correction in the camera field of view. Render engine 26 receives video input signals (I) and produces the video output (O) to display 14 as is understood by persons skilled in the art. In addition to conventional rendering software 28, render engine 26 includes field of view (FOV) resolver 30 and color correction engine 32 to generate the color correction of video output (O) as described in more detail below. A complete LED video wall display system will also include a video processor, which may encompass the render engine or be configured between the render engine and display, such as video processor 27. In the example depicted in FIG. 3A, API 34 is shown as facilitating communication between the correction engine and database. In one embodiment, correction engine 32 retrieves all required uniformity information from database 24 initially via API 34 and stores it in a local cache memory so that correction engine 32 can utilize portions of the data as needed without a need to constantly retrieve data via API as the camera tracking data changes. Alternatively, in other embodiments, resolver 30 and correction engine 32 may communicate direction with one another and with database 24. In further alternatives, the color correction function of correction engine 32 may be directly incorporated into the render engine or other system control. It is to be noted that dashed connectors in FIGS. 3A-C indicate alternative communication or data paths and dashed boxes indicate alternative components which may be required parts of an overall video wall display system but which are optionally included in embodiments of off-axis color correction systems of the present disclosure. As will be appreciated by persons skilled in the art, correction engine 32 may be configured as part of system video processor, which may be separate from or encompassed within an overall system controller such as controller 16.

Render engine 26 also receives real-time information on the position (e.g. x,y,z coordinates), and angle (A) and field of view (B) for camera 12 relative via resolver 30. In systems where the display is not fixed, information on the position of display 14 (e.g., x,y,z coordinates) is also provided so that a position of the camera relative to the display, which may include relative horizontal and vertical angles (H,V) of the camera to the display, is determined by resolver 30. Camera and display positions may be generated by internal position sensors or by external devices. Many video wall display systems, particularly those configured as three-dimensional LED volumes for video production sets, already include a sophisticated camera tracking system 12A, which may provide the inputs to resolver 30. Alternatively, in systems where an existing camera tracking system itself generates the required angle and field of view information, the output of the camera tracking system may be used as the input to correction engine 32, in which case resolver 30 would not be required as another functional component. The camera angle and field of view information determined in resolver 30 (or in a camera tracking system) is then used to retrieve the correct segment of the off-axis uniformity characteristics from the metadata database, in this example via the API. Using the metadata segment retrieved from the database corresponding to the current camera view, correction engine 32 determines and applies a uniformity correction layer 14" to the image data delivered to the portion of the display in the current field of view.

In the example illustrated in FIG. 3A, segments J, K, and L of metadata 14' represent hypothetical field of view segments retrieved by render engine 26 (via API 34) from database 24. When these segments are reported to correction engine 32, the correction engine applies the uniformity correction layer in the appropriate field of view and display position/angle to correct the portion of the display captured by the camera as it tracks across the display. In some embodiments the uniformity correction layer comprises color correction functions such as an inverse color function (as illustrated in FIG. 1A for the horizontal viewing axis) to invert the metadata segment, represented by inverted segments J', K' and L', so as to apply the appropriate color correction for the rendered image in the current field of view. Other color correction functions, such as a color normalizing function may be employed. Regardless of the type of color correction function, in a further option, plural color correction functions may be stored, for example in database 24, and selectable by the user through the video processing system user interface (not shown). Alternatively, or additionally, database 24 may contain instructions for execution in a processor in or communicating with the correction engine, which instructions cause a specific color correction function to be generated by the correction engine or for the correction engine. Again color correction function generated in this manner may also be user selectable.

Figure 3B:
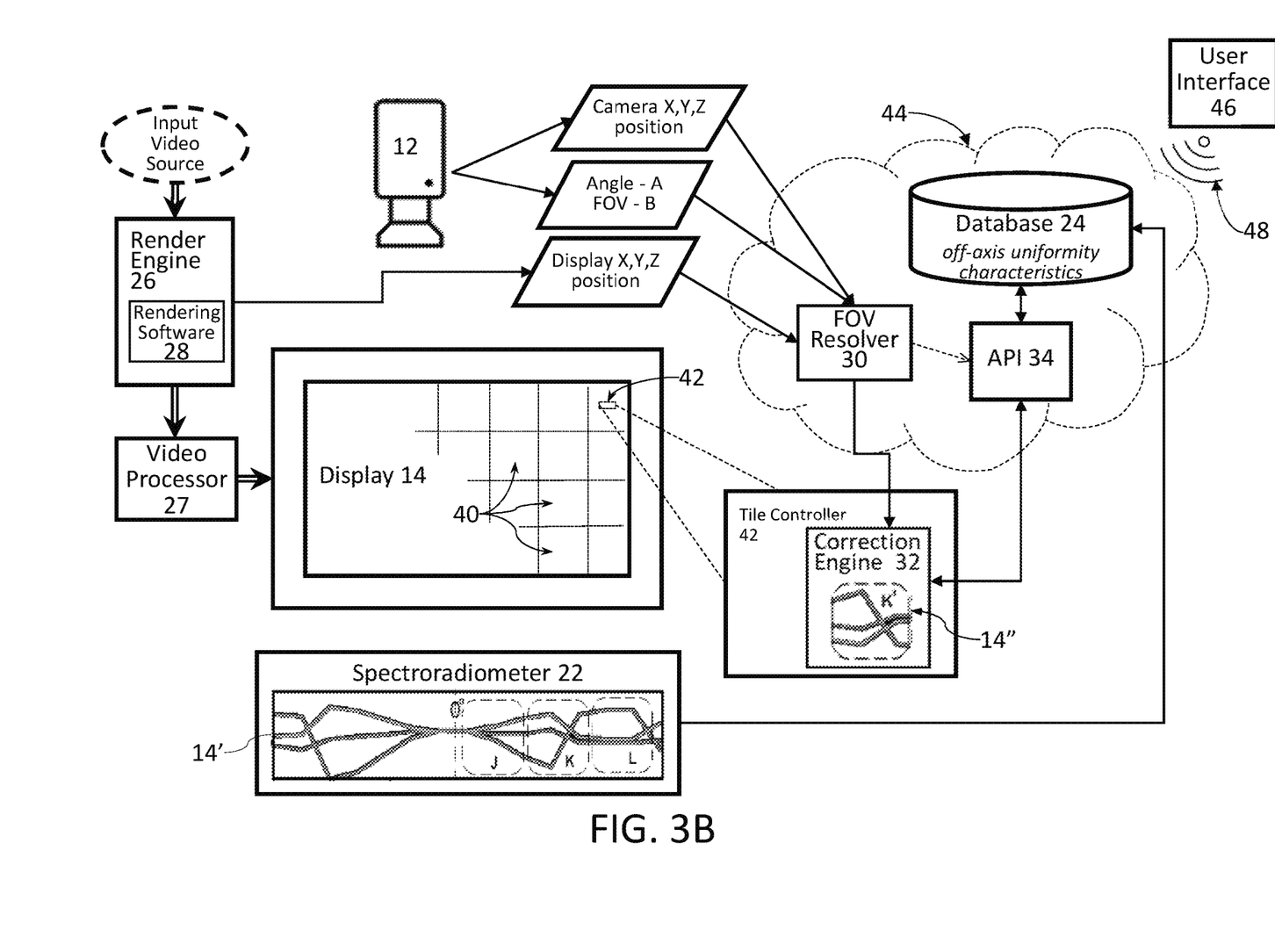
FIG. 3B is a block diagram illustrating an alternative embodiment for off-axis color correction in dynamic image capture of video wall displays according to the present disclosure with color correction executed in the LED tile controller.

In an alternative embodiment, as illustrated in FIG. 3B, color correction engine 32 may be disposed in the individual tile controllers of display 14. As is well understood in the art, LED display walls are comprised of an array of LED tiles 40. Each tile carries an array of LED pixels on a substrate such as a PCB, and a tile controller 42 (typically mounted on the back of the PCB) receives the video packets routed to that tile and, among other functions, routes the video information to the appropriate pixels to generate the displayed image. Tile controller 42 may comprise a computing device as elsewhere described herein. In this embodiment, the functions of and interactions between correction engine 32, resolver 30, API 34 and database 24 are substantially as described above. In this example, video processor 27 is positioned in the video data stream between the render engine 26 and display 14, but may be otherwise configured or positioned as described above. However, in this embodiment much of the functionality can be provided via networked computing solutions, for example located in the cloud 44 or other suitable network. With internet connected systems, correction engine 32 could be uploaded to the tile controllers of an existing LED display system and color correction provided via a SaaS model. In such embodiments, user interface 46 may be separately provided with a communication link 48 to the cloud or network-based application system 44 to facilitate user control, input and color correction function selection. Communication link 48 may be a wireless or hard-wired communication link as appropriate. In some examples, user interface 46 may comprise a website or software application executed on a mobile device.

Figure 3C:
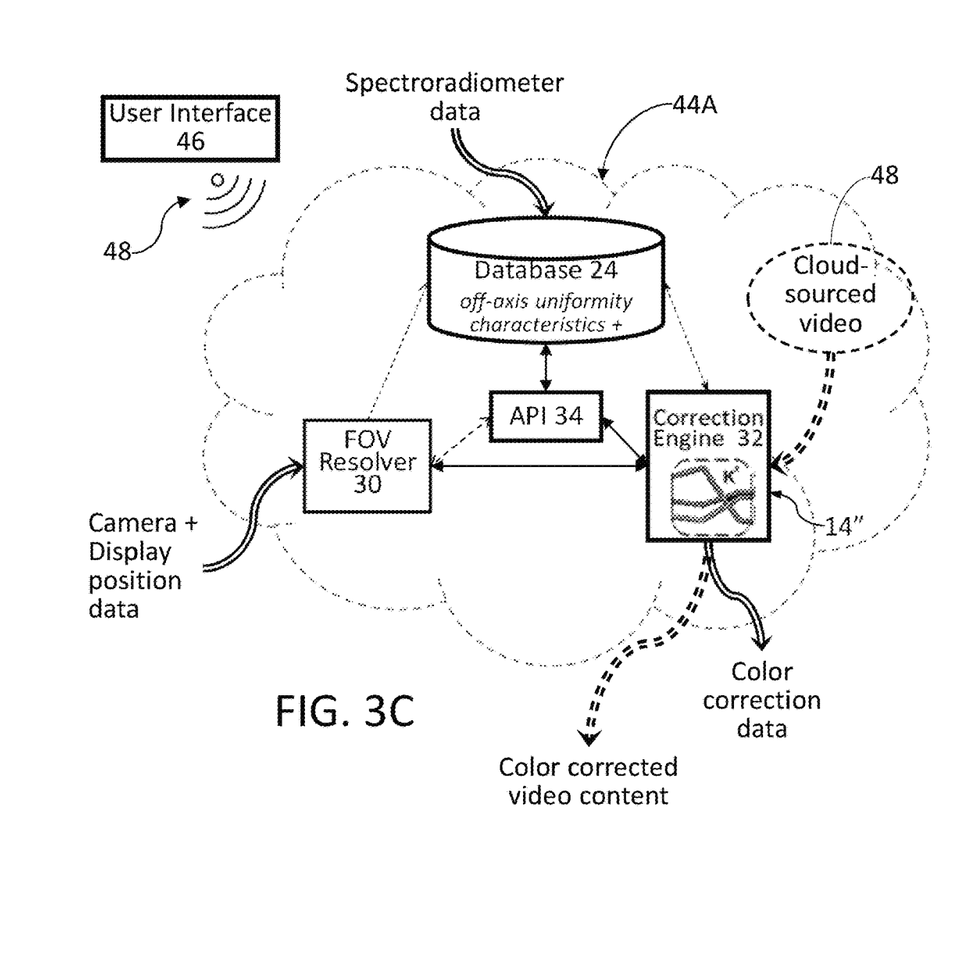
FIG. 3C is a block diagram illustrating a further alternative embodiment for off-axis color correction in dynamic image capture of video wall displays according to the present disclosure.

In a further alternative embodiment, as illustrated in FIG. 3C, correction engine 32 may be part of a cloud or network-based system 44A, which also contains database 24, resolver 30 and, optionally, API 34. User interface 46 again allows for user interaction with system 44A via communication link 48 as described above. It is to be noted that database 24 as described herein for any embodiments need not be a monolithic storage device. Distributed/cloud-based storage may be utilized as is well-understood in the computing arts. In a further alternative embodiment, cloud-sourced video content 48 may be routed through correction engine 32 for application of the correction layer in a cloud-based or network-based system such as system 44A. In this case, the output from the system 44A may comprise color corrected video content.

Illustrative processes according to the present disclosure are further described with reference to exemplary process flow 50 in FIG. 4. As illustrated therein, color uniformity characteristics for specific LED tiles or displays may be measured or otherwise determined at any time (52A) and then stored in database 24 at step 52. In practice, it is contemplated that color uniformity characteristics for many different tile types by different manufacturers will be stored in the database so that a system may automatically detect and request the appropriate stored tile data, or alternatively a user may select the tiles types corresponding to a current display from a menu of stored tiles. Color uniformity characteristics for the display are retrieved by correction engine 32 at step 54 and optionally stored in a local memory cache. Correction engine 32 also receives identification of the current camera field of view (FOV) at step 56. FOV information may be determined by FOV resolver 30 at optional step 56A, or alternatively received from other sources, such as an existing camera tracking system (e.g., camera tracking system 12A in FIG. 3A). Using the designated correction function, correction engine 32 generates the correction layer for the current camera FOV at step 58. Correction engine 32 then applies the correction layer to the video data for the current camera FOV at step 60 to create a corrected video stream, which is subsequently presented on the display at step 62. As the camera pans or tracks across the display, the process continually loops from applying the current correction layer at step 60 back to identifying the next current camera field of view at step 56. It is to be noted that the various steps outlined in FIG. 4 need not be performed in the exact order presented in the figure. Persons of ordinary skill may derive alternative orders based on the teachings contained herein.

Figure 4:
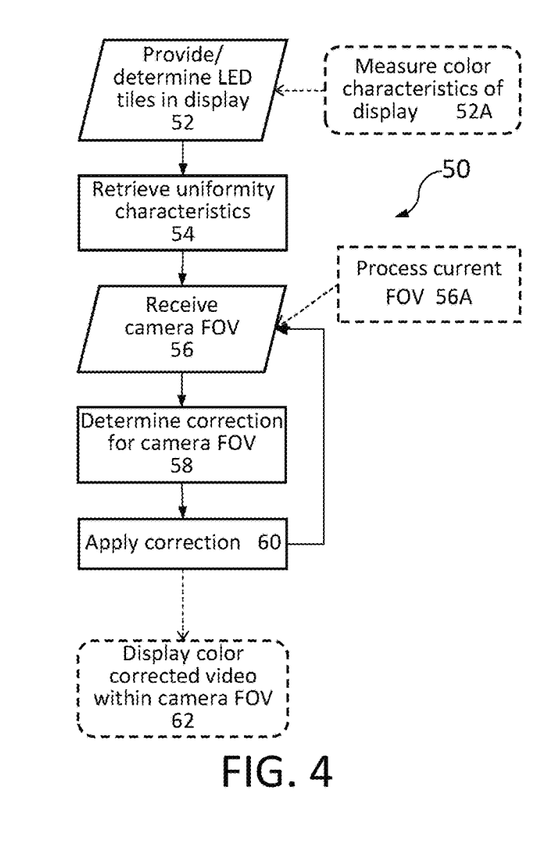
FIG. 4 is a flow chart showing an embodiment of an off-axis color correction process according to the present disclosure.

Determination of the correction function to generate the correction layer and application of the correction layer as summarized in steps 58 and 60 of FIG. 4 may be further illustrated by the following simplified example based on correction along a horizontal viewing angle only. In this example, and with reference to FIG. 1A, the process of color correction using a color normalizing function as the color correction function to generate a color correction layer for the field of view may be expressed mathematically as:

$$[Rg^*, Gg^*, Bg^*] \times [R,G,B] = [R^*, G^*, B^*] \quad [1]$$

and $$[X/Rg, Y/Gg, Z/Bg] = [Rg^*, Gg^*, Bg^*] \quad [2]$$

Where:
[Rg*, Gg*, Bg*] is the correction layer;
[R, B, G] is input video signal color coordinates for the FOV;
[R*, B*, G*] is the corrected color coordinates to be displayed at the FOV;
[X, Y, Z] is reference relative color gain at zero degree viewing angle, e.g., reference (R) in FIG. 1A;
[Rg, Gg, Bg] is relative color gain at the FOV; and
[X/Rg, Y/Gg, Z/Bg] is the correction function.

Again with reference to FIG. 1A, it can be seen that the relative color gain at example point (E), viewing angle −α, is:

$$[Rg, Gg, Bg] = [0.70, 1.15, 0.95] \quad [3]$$

The reference color gain at the reference point (R) is $$[X, Y, Z] = [1.00, 1.00, 1.00] \quad [4]$$

Thus, the correction function values are:

$$[1.00/0.70, 1.00/1.15, 1.00/0.95] \quad [5]$$

And the correction layer per equation [2] above is presented as a matrix as:

$$[1.43, 0.87, 1.05] \quad [6]$$

Assuming a true color to be emitted at example point (E) as a pale blue color with the following coordinates:

$$[R,G,B] = [102, 178, 240] \quad [7]$$

Then the corrected color coordinates shift the emitted color from pale blue to a color with a slight violet tint to correct for the viewing angle −α with the following coordinates:

$$[R^*, G^*, B^*] = [145.86, 154.86, 252.00] \quad [8]$$

$$(\text{Checksum: } [1.43, 0.87, 1.05] * [0.70, 1.15, 0.95] = [1.00, 1.00, 1.00]) \quad [9]$$

It is to be noted that the example presented above and the representation of relative color gain levels in FIG. 1A are highly simplified to facilitate and abbreviate the explanation. For example, the calculation of the color correction for example (E) addresses only color correction at a single nominal angle. If the nominal angle represents the camera angle, then the FOV angle will encompass a field of varying relative color gains on each side of the nominal angle that also must be corrected. Additionally, this example and FIG. 1A only address the simplified problem of variation on the horizontal viewing axis alone. In practice, the same functions must be resolved over the entire vertical field of view angle as well. However, while simplified, this example presents all of the necessary information and methodology to permit a person of ordinary skill in the art to extrapolate the correction across an entire camera field of view at any viewing angle.

Systems and methods herein described may be implemented using one or more computing devices and, except where otherwise indicated, may include standard computing components of processors, memory, storage and communications busses, as well as high resolution graphics rendering hardware and software where required. Such components may be configured and programmed by persons of ordinary skill based on the teachings of the present disclosure. Software programing implementing systems and methods described herein may reside on a non-transient computer readable media as a computer program product. Computing devices in general also include cloud-based computing embodiments and computing systems with elements distributed across networks.

Figure 5:
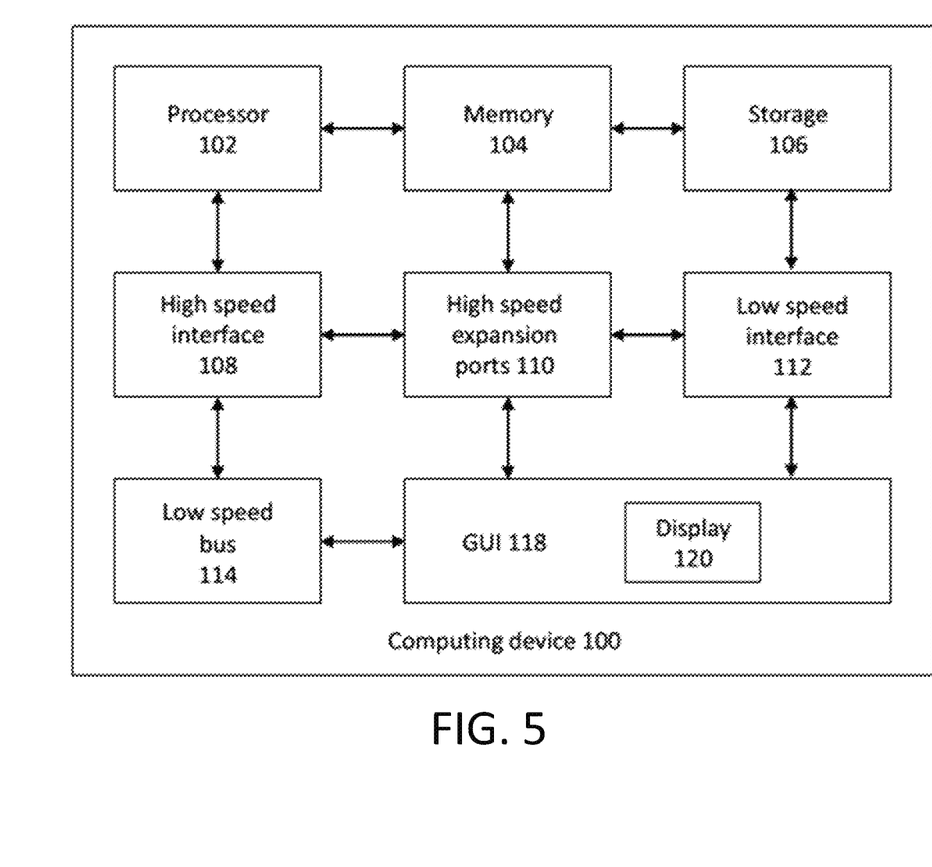
FIG. 5 is a block diagram illustrating an example of a computing device as may be utilized in the systems and methods of the present disclosure

In some embodiments, control functions, such as those occurring in system controller 16, tile controller 42, render engine 26, resolver 30 or correction engine 32, for example, may be executed as one or more computing devices, or may be collectively executed in a single or plural computing device. FIG. 5 illustrates one example of such a computing device, wherein computing device 100 includes one or more processors 102, memory 104, storage device 106, high speed interface 108 connecting to memory 104 and high speed expansion ports 110, and a low speed interface 112 connecting to low speed bus 114 and storage device 106. Each of the components 102, 104, 106, 108, 110, and 112, are interconnected using various busses or other suitable connections as indicated in FIG. 5 by arrows connecting components. The processor 102 can process instructions for execution within the computing device 100, including instructions stored in the memory 104 or on the storage device 106 to display graphical information via GUI 118 with display 120, or on an external user interface device, coupled to high speed interface 108. As will be appreciated by persons of ordinary skill, certain described functions, for example those of render engine 26, may not require an independent GUI or display. In other implementations, multiple processors and/ or multiple buses may be used, as appropriate, along with multiple memories and types of memory. Also, multiple computing devices 100 may be connected, with each device providing portions of the necessary operations (e.g., as a server bank, a group of blade servers, or a multi-processor system).

Memory 104 stores information within the computing device 100. In one implementation, the memory 104 is a computer-readable medium. In one implementation, the memory 104 is a volatile memory unit or units. In another implementation, the memory 104 is a non-volatile memory unit or units.

Storage device 106 is capable of providing mass storage for computing device 100, and may contain information such as timing control, time slice size and/or static color chroma and timing as described hereinabove. In one implementation, storage device 106 is a computer-readable medium. In various different implementations, storage device 106 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 104, the storage device 106, or memory on processor 102.

High speed interface 108 manages bandwidth-intensive operations for computing device 100, while low speed interface 112 manages lower bandwidth-intensive operations. Such allocation of duties is exemplary only. In one implementation, high speed interface 108 is coupled to memory 104, display 120 (e.g., through a graphics processor or accelerator), and to high-speed expansion ports 110, which may accept various expansion cards (not shown). In the implementation, low speed interface 112 is coupled to storage device 106 and low speed expansion port 114. The low speed expansion port, which may include various communication ports (e.g., USB, Bluetooth, Ethernet, wireless Ethernet) may be coupled to one or more input/output devices as part of GUI 118 or as a further external user interface, such as a keyboard, a pointing device, a scanner, or a networking device such as a switch or router, e.g., through a network adapter.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device separate from video display 14. LED displays are now most common, however older display technologies (e.g., a CRT (cathode ray tube) or LCD (liquid crystal display) monitor) may be used. Other interface devices may include a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of wired or wireless digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other. Processing capacities and capabilities described herein also may be implemented as cloud-based or other network-based processing modules and may also be implemented using a software as a service ("SaaS") model.

Using systems and methods thus described, the color variations with view angle as illustrated in FIGS. 6A-B and 7A-B and distortions and artifacts as seen in FIG. 9 may be reduced or eliminated for the camera angle and field of view at any moment. The disclosed systems and methods thus may be used to increase the quality and flexibility of live broadcast systems employing dynamic LED wall backgrounds and to reduce the time and expense of post-processing image correction for movie set systems similarly using dynamic LED wall backgrounds.

The foregoing has been a detailed description of illustrative embodiments of the disclosure. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

Exemplary embodiments have been disclosed above and illustrated in the accompanying drawings. It will be understood by those skilled in the art that various changes, omissions and additions may be made to that which is specifically disclosed herein without departing from the spirit and scope of the present disclosure.

What is claimed is:

1. A system for off-axis color correction in dynamic image capture of video displays, comprising:
   a database containing off-axis color uniformity characteristics for a video display at a plurality of viewing angles; and
   a correction engine configured to receive off-axis color uniformity characteristics from the database, and to apply a color uniformity correction layer to a video stream to be presented on the video display, wherein the color uniformity correction layer is based on the received off-axis color uniformity characteristics for a current image capture angle and field of view, whereby color distortions in the captured images due to off-axis image capture are reduced or eliminated;
   wherein the correction engine is further configured to:
   generate relative color gain levels for the display across the capture device field of view;
   generate the color correction function as a normalizing function based on comparison of the relative color gain levels across said field of view with color gain levels at a zero degree viewing angle reference; and
   calculate corrected color values across the field of view based on the normalizing function.

2. The system of claim 1, further comprising a field of view (FOV) resolver configured to determine the current angle and field of view of the image capture device with respect to a video display based on inputs from a camera tracking system.

3. The system of claim 1, further comprising an application programing interface controlling communication between at least the database and correction engine.

4. The system of claim 1, wherein the correction engine is further configured to generate the color uniformity correction layer based on the received off-axis color uniformity characteristics and a color correction function.

5. The system of claim 4, wherein:
   the database contains instructions executable in the correction engine for generating plural different color correction functions including at least one of an inverse color function or a color normalizing function; and
   the color correction functions are user selectable.

6. The system of claim 5, further comprising a user interface configured for user selection of the color correction function.

7. The system of claim 1, further comprising:
   an LED video display wall comprised of an array of LED tiles;
   tile controllers associated with plural of said LED tiles, said tile controllers configured to route a video signal to pixels of said tiles;
   wherein said correction engine is disposed in plural of said tile controllers.

8. The system of claim 7, wherein said LED video display wall comprises a facetted LED video display.

9. The system of claim 7, further comprising a camera tracking system communicating with the FOV resolver.

10. The system of claim 1, wherein said off-axis color uniformity characteristics for the video display comprise spectroradiometer readings taken at a plurality of viewing angles across a display surface of the video display.

11. The system of claim 10, further comprising a spectroradiometer communicating with the database.

12. The system of claim 1, wherein the correction engine is configured to be disposed in plural of tile controllers of an LED display wall comprised of LED tiles.

13. The system of claim 1, wherein the correction engine is configured to be disposed in a video processing render engine that renders the video for presentation on the display.

14. The system of claim 1, wherein the database contains instructions executable by a processor to cause the color correction engine to generate said relative color gain levels and the color correction function, and to calculate the corrected color values based thereon.

15. The system of claim 1, further comprising an LED video display wherein the LED video display comprises faceted video display having display surfaces lying in angled planes joined along facet meets.

16. The system of claim 15, wherein the facetted video display comprises a three-dimensional LED volume.

17. The system of claim 1, further comprising an application programing interface controlling communication between at least the database and correction engine.

* * * * *